US010034312B2

(12) United States Patent
Lee et al.

(10) Patent No.: US 10,034,312 B2
(45) Date of Patent: Jul. 24, 2018

(54) METHOD FOR INITIATING A RANDOM ACCESS PROCEDURE IN A CARRIER AGGREGATION SYSTEM AND A DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/535,786

(22) PCT Filed: Jan. 18, 2016

(86) PCT No.: PCT/KR2016/000496
§ 371 (c)(1),
(2) Date: Jun. 14, 2017

(87) PCT Pub. No.: WO2016/117886
PCT Pub. Date: Jul. 28, 2016

(65) Prior Publication Data
US 2017/0374687 A1 Dec. 28, 2017

Related U.S. Application Data

(60) Provisional application No. 62/105,222, filed on Jan. 20, 2015.

(51) Int. Cl.
*H04W 74/08* (2009.01)
(52) U.S. Cl.
CPC ... *H04W 74/0833* (2013.01); *H04W 74/0891* (2013.01)
(58) Field of Classification Search
CPC . H04W 24/10; H04W 72/0426; H04W 28/16; H04W 4/00
See application file for complete search history.

(56) References Cited

U.S. PATENT DOCUMENTS

| 2012/0257570 A1* | 10/2012 | Jang | H04W 76/19 370/328 |
| 2013/0258882 A1* | 10/2013 | Dinan | H04W 56/001 370/252 |
| 2013/0258958 A1 | 10/2013 | Dinan | |

FOREIGN PATENT DOCUMENTS

| WO | 2013015453 A1 | 1/2013 |
| WO | 2013137666 A1 | 9/2013 |

OTHER PUBLICATIONS

3GPP TS 36.331-V11.10.0, 3rd Generation Partnership Project; Technical Specification Group Radio Access Network; Evolved Universal Terrestrial Radio Access; Radio Resource Control, Jan. 5, 2015, Protocol specification.

* cited by examiner

*Primary Examiner* — Chuong A Ngo
(74) *Attorney, Agent, or Firm* — Dentons US LLP

(57) ABSTRACT

The present invention relates to a wireless communication system. More specifically, the present invention relates to a method and a device for initiating a random access procedure in a carrier aggregation system, the method comprising: receiving, from a network, an Radio Resource Control (RRC) signal which configures a new Secondary Cell (SCell) with Physical Uplink Control Channel (PUCCH) resource; checking whether a Time Alignment Timer (TAT) associated with a Timing Advance Group (TAG) to which the new SCell with the PUCCH resource belong is running or not; and initiating a random access procedure on the New SCell in the TAG if the associated TAT is not running.

10 Claims, 11 Drawing Sheets

【Figure 1】
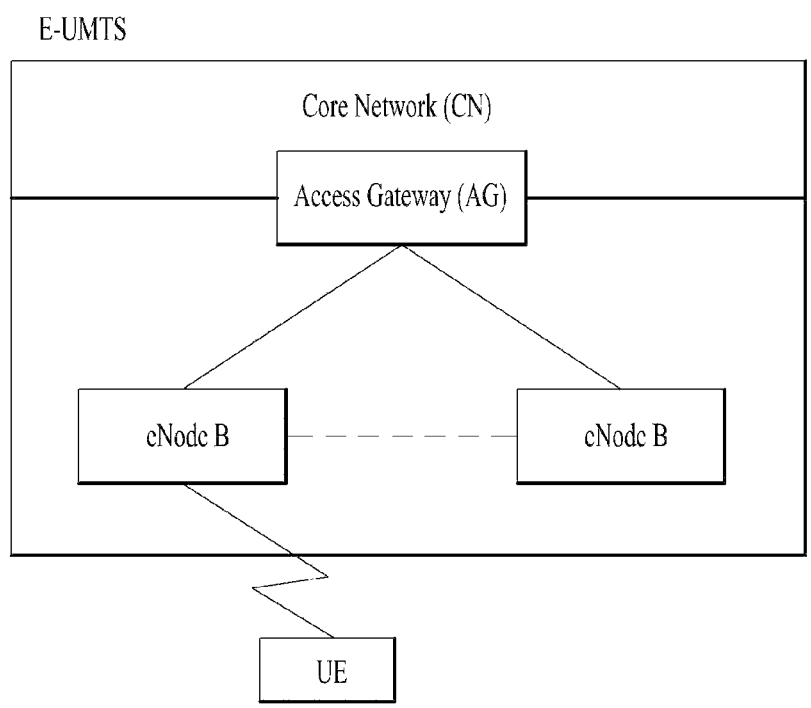

[Figure 2a]
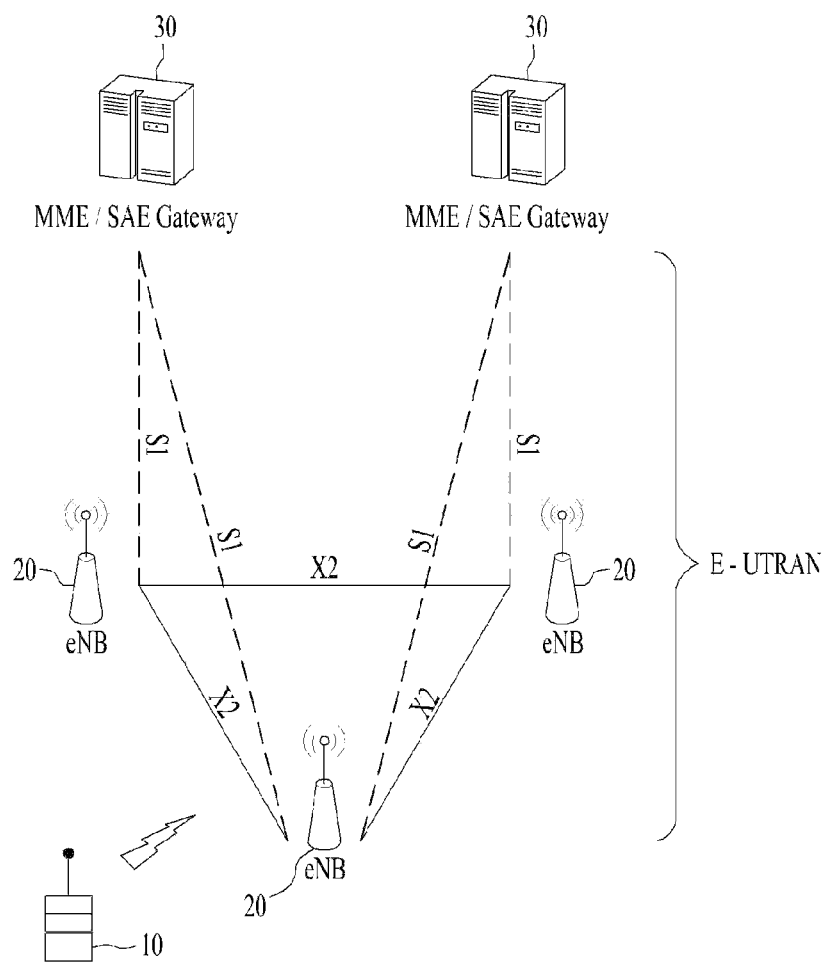

【Figure 2b】
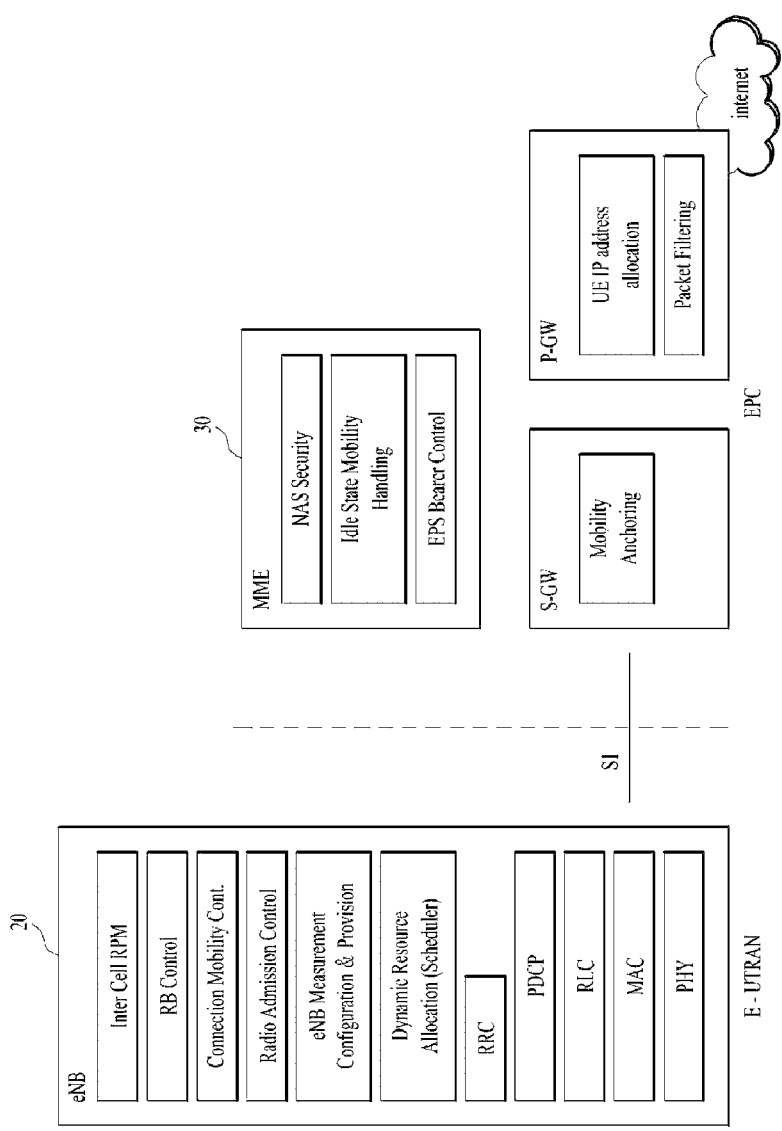

【Figure 3】
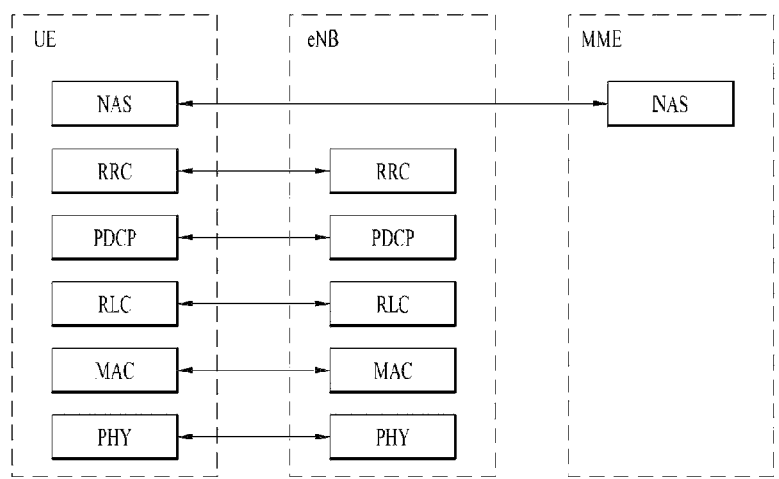
(a) Control-Plane Protocol Stack
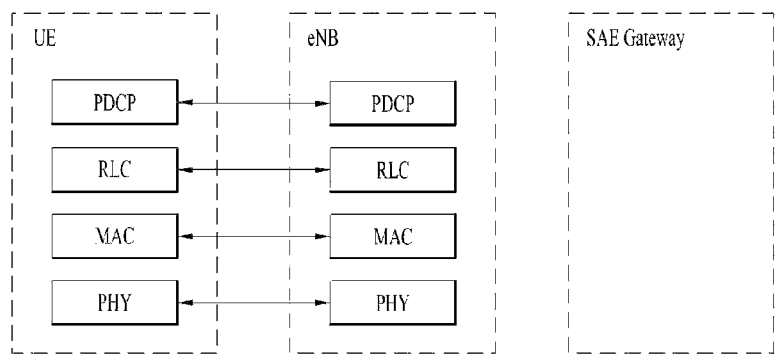
(b) User-Plane Protocol Stack 【Figure 4】
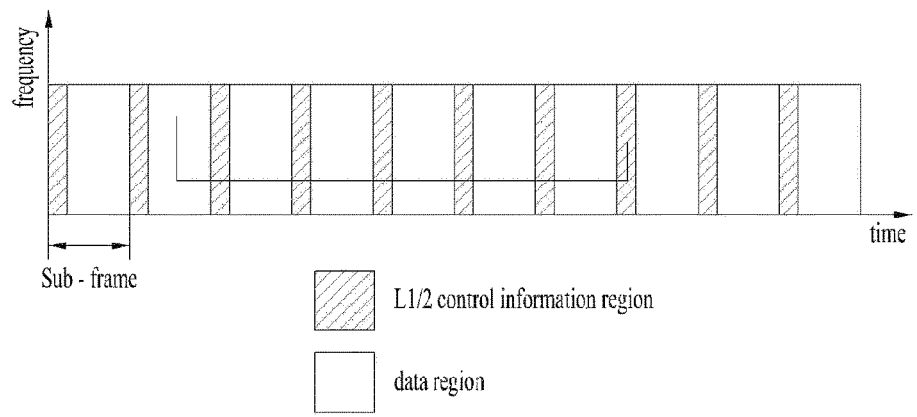
【Figure 5】
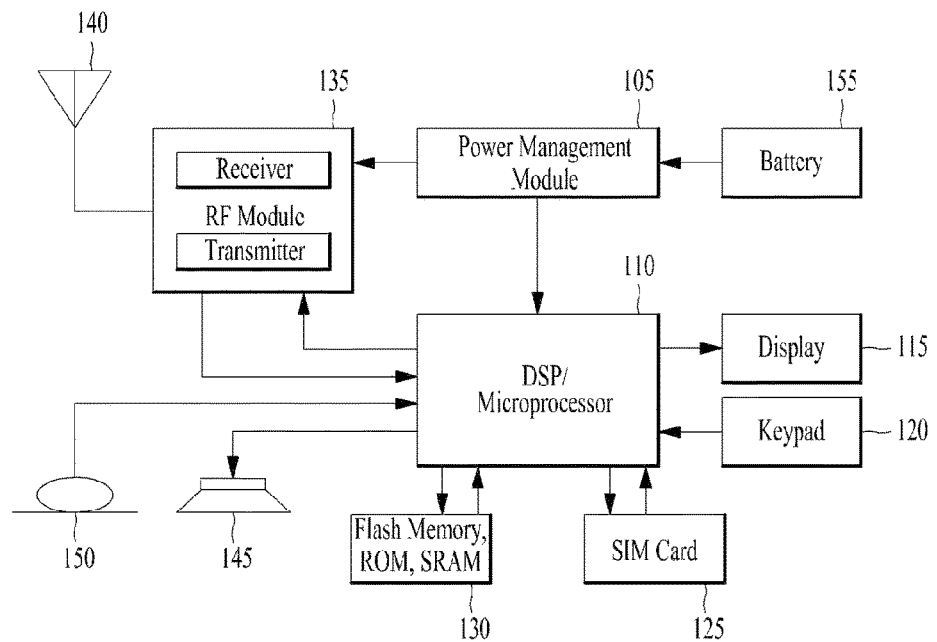

[Figure 6]
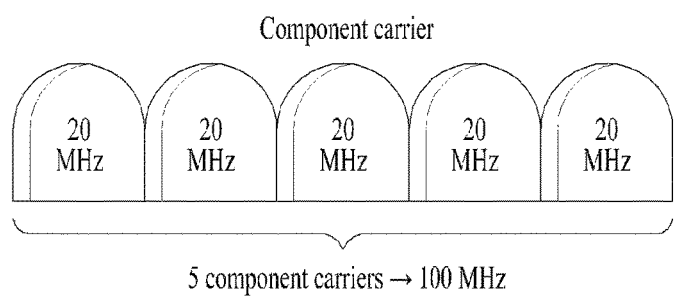
[Figure 7]
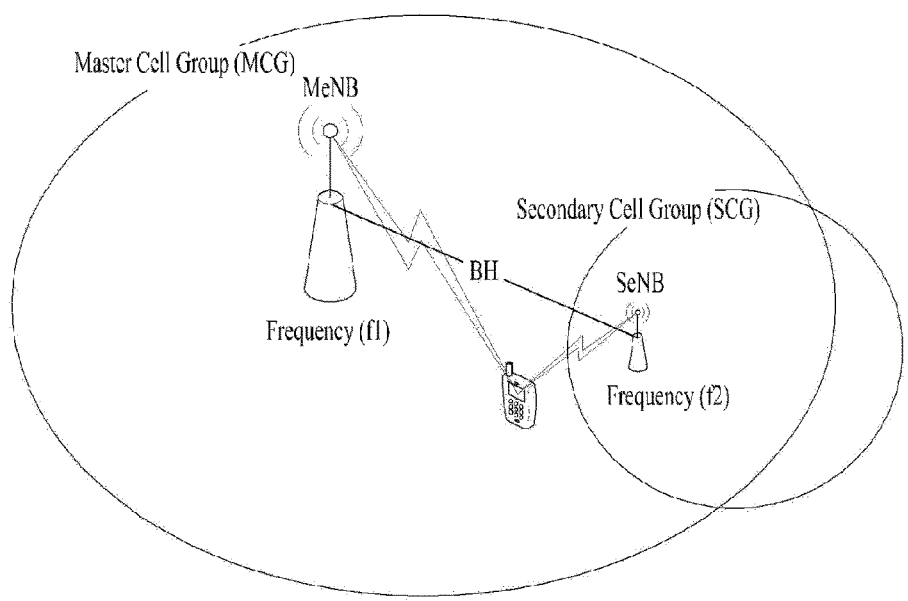

【Figure 8】
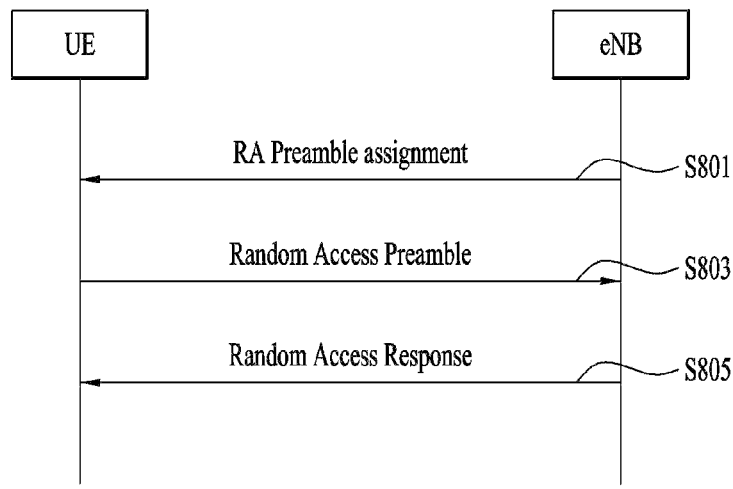
【Figure 9】
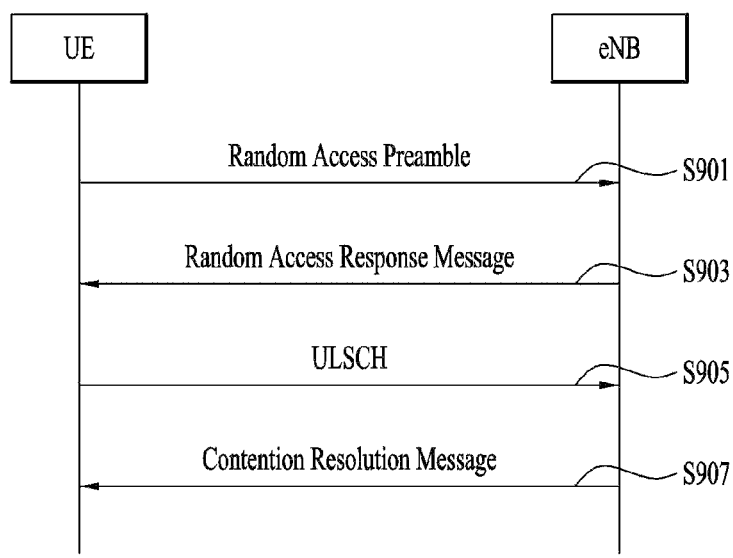

[Figure 10]
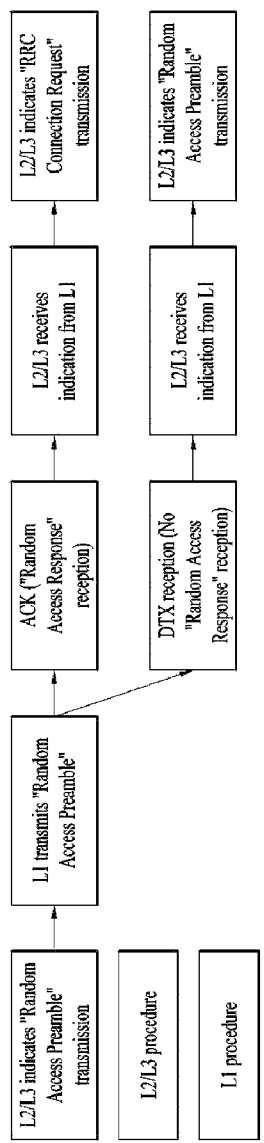

【Figure 11】
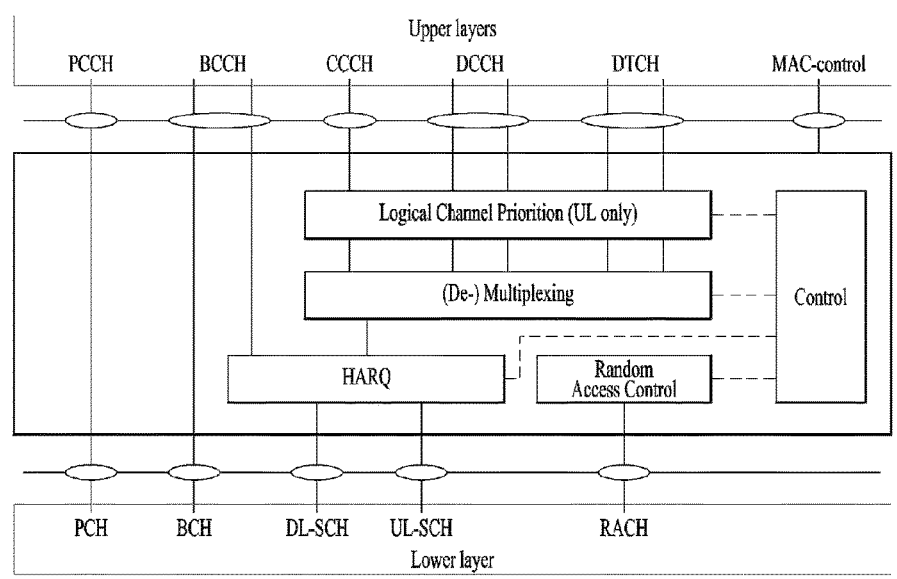

【Figure 12】
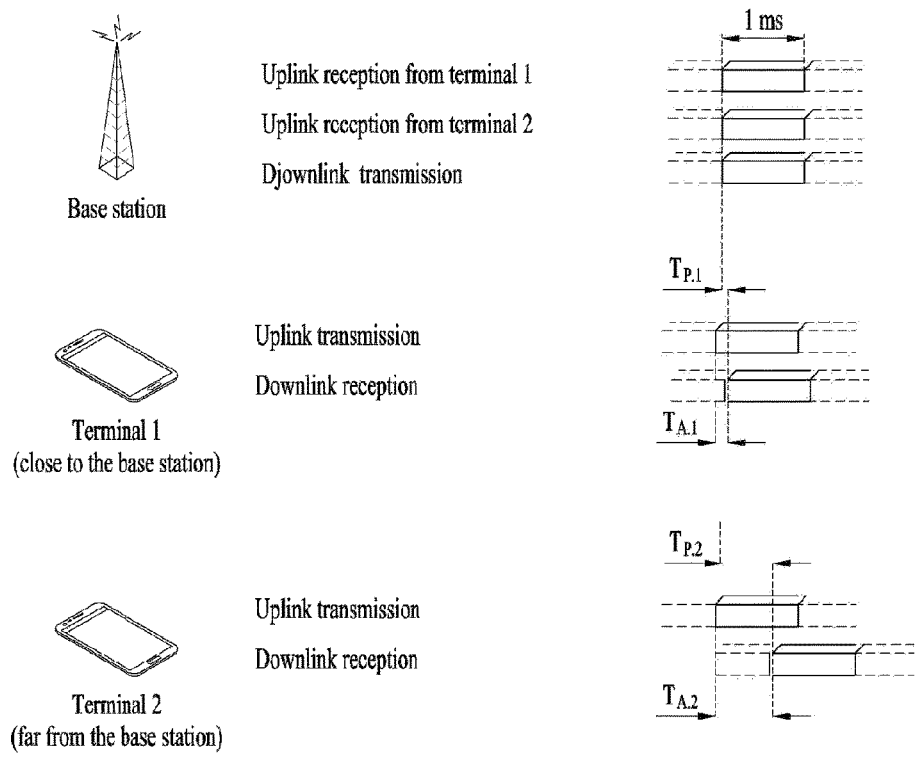
【Figure 13】

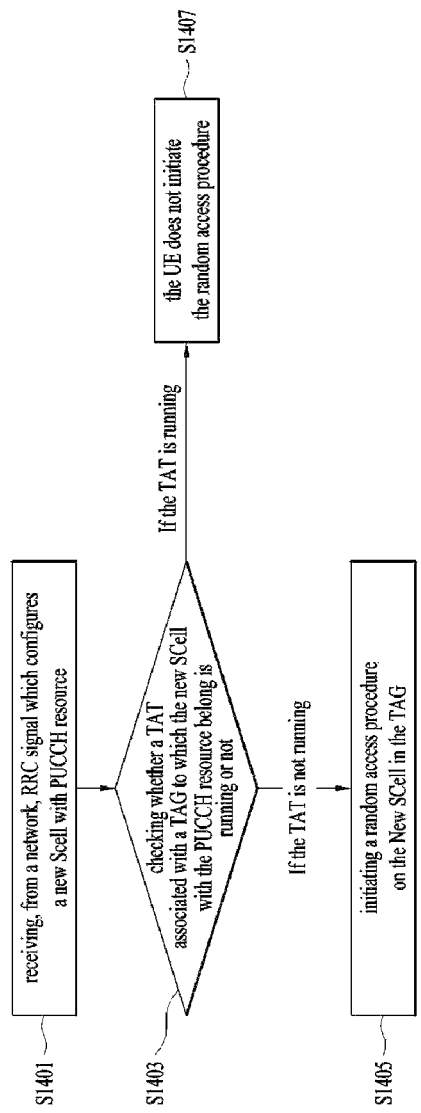
【Figure 14】

METHOD FOR INITIATING A RANDOM ACCESS PROCEDURE IN A CARRIER AGGREGATION SYSTEM AND A DEVICE THEREFOR

This application is a 35 USC § 371 National Stage entry of International Application No. PCT/KR2016/000496 filed on Jan. 18, 2016, and claims priority to U.S. Provisional Application No. 62/105,222 filed on Jan. 20, 2015, all of which are hereby incorporated by reference in their entireties as if fully set forth herein.

TECHNICAL FIELD

The present invention relates to a wireless communication system and, more particularly, to a method for initiating a random access procedure in a carrier aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for initiating a random access procedure in a carrier aggregation system. The technical problems solved by the present invention are not limited to the above technical problems and those skilled in the art may understand other technical problems from the following description.

Technical Solution

The object of the present invention can be achieved by providing a method for a UE operating in a wireless communication system, the method comprising: receiving, from a network, an Radio Resource Control (RRC) signal which configures a new Secondary Cell (SCell) with Physical Uplink Control Channel (PUCCH) resource; checking whether a Time Alignment Timer (TAT) associated with a Timing Advance Group (TAG) to which the new SCell with the PUCCH resource belong is running or not; and initiating a random access procedure on the New SCell in the TAG if the associated TAT is not running.

In another aspect of the present invention provided herein is an apparatus in the wireless communication system, the apparatus comprising: a Radio Frequency (RF) module; and a processor configured to control the RF module, wherein the processor is configured to receive, from a network, an Radio Resource Control (RRC) signal which configures a new Secondary Cell (SCell) with Physical Uplink Control Channel (PUCCH) resource, to check whether a Time Alignment Timer (TAT) associated with a Timing Advance Group (TAG) to which the new SCell with the PUCCH resource belong is running or not, and to initiate a random access procedure on the New SCell in the TAG if the associated TAT is not running.

Preferably, the random access procedure is initiated by a Medium Access Control (MAC) entity.

Preferably, the RRC signal includes at least one of: an identifier of the new SCell with the PUCCH resource to be configured, or an identifier of the TAG to which the new SCell with the PUCCH resource belong.

Preferably, when the UE receives the RRC signal which configures a new SCell with PUCCH resource to the TAG from the network, a RRC entity of the UE transmits an indication indicating a MAC entity of the UE to add the new SCell with the PUCCH resource to the TAG.

Preferably, when the MAC entity of the UE receives the indication indicating the new SCell with the PUCCH resource is added to the TAG, the MAC entity of the UE checks whether the TAT associated with the TAG is running or not, if the TAT associated with the TAG is not running, the MAC entity of the UE initiates the random access procedure, and if the TAT associated with the TAG is running, the MAC entity of the UE does not initiate the random access procedure.

Preferably, the method further comprises: initiating a random access procedure on a PCell or a SCell already belonging to the TAG instead of the new SCell.

It is to be understood that both the foregoing general description and the following detailed description of the present invention are exemplary and explanatory and are intended to provide further explanation of the invention as claimed.

Advantageous Effects

According to the present invention, initiating a random access procedure can be efficiently performed in a carrier aggregation system. Specifically, when a SCell configured with PUCCH resource (PUCCH SCell) is newly configured for a UE, the UE triggers a random access procedure if the PUCCH SCell belongs to a TAG for which the associated timeAlignmentTimer (TAT) is not running.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2a is a block diagram illustrating network structure of an evolved universal mobile telecommunication system (E-UMTS), and FIG. 2b is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for carrier aggregation;

FIG. 7 is a conceptual diagram for Dual Connectivity (DC) between a Master Cell Group (MCS) and a Secondary Cell Group (SCG);

FIG. 8 is a diagram for an example method for performing a non-contention-based random access procedure;

FIG. 9 is a diagram for an example method for performing a contention-based random access procedure;

FIG. 10 is a view illustrating for interaction model between L1 and L2/3 for Random Access Procedure;

FIG. 11 is a diagram for MAC structure overview in a UE side;

FIG. 12 is a diagram for uplink timing advance;

FIG. 13 is a diagram for transmitting RRCConnection-Reconfiguration message from E-UTRAN and to UE; and FIG. 14 is a conceptual diagram for initiating a random access procedure in a carrier aggregation system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots.

The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

FIG. 6 is a diagram for carrier aggregation.

Carrier Aggregation (CA) technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to a SCell is a Downlink Secondary Component Carrier (DL SCC) while in the uplink it is an Uplink Secondary Component Carrier (UL SCC).

The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The configured set of serving cells for a UE therefore always consists of one PCell and one or more SCells:

For each SCell the usage of uplink resources by the UE in addition to the downlink ones is configurable (the number of DL SCCs configured is therefore always larger than or equal to the number of UL SCCs and no SCell can be configured for usage of uplink resources only);

From a UE viewpoint, each uplink resource only belongs to one serving cell;

The number of serving cells that can be configured depends on the aggregation capability of the UE;

PCell can only be changed with handover procedure (i.e. with security key change and RACH procedure);

PCell is used for transmission of PUCCH;

Unlike SCells, PCell cannot be de-activated;

Re-establishment is triggered when PCell experiences RLF, not when SCells experience RLF;

NAS information is taken from PCell.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

FIG. 7 is a conceptual diagram for Dual Connectivity (DC) between a Master Cell Group (MCS) and a Secondary Cell Group (SCG).

The Dual Connectivity (DC) means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

The Dual Connectivity is a kind of carrier aggregation in that the UE is configured a plurality serving cells. However, unlike all serving cells supporting carrier aggregation of FIG. 6 are served by a same eNB, all serving cells supporting dual connectivity of FIG. 7 are served by different eNBs, respectively at same time. The different eNBs are connected via non-ideal backhaul interface because the UE is connected with the different eNBs at same time.

With Dual Connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

For SCG, the following principles are applied:

At least one cell in SCG has a configured UL CC and one of them, named PSCell, is configured with PUCCH resources;

When SCG is configured, there is always at least one SCG bearer or one Split bearer;

Upon detection of a physical layer problem or a random access problem on PSCell, or the maximum number of RLC retransmissions has been reached associated with the SCG, or upon detection of an access problem on PSCell (T307 expiry) during SCG addition or SCG change:

RRC connection Re-establishment procedure is not triggered;

All UL transmissions towards all cells of the SCG are stopped;

MeNB is informed by the UE of SCG failure type.

For split bearer, the DL data transfer over the MeNB is maintained.

Only the RLC AM bearer can be configured for the split bearer;

Like PCell, PSCell cannot be de-activated;

PSCell can only be changed with SCG change (i.e. with security key change and RACH procedure);

Neither direct bearer type change between Split bearer and SCG bearer nor simultaneous configuration of SCG and Split bearer are supported.

With respect to the interaction between MeNB and SeNB, the following principles are applied:

The MeNB maintains the RRM measurement configuration of the UE and may, e.g, based on received measurement reports or traffic conditions or bearer types, decide to ask a SeNB to provide additional resources (serving cells) for a UE.

Upon receiving the request from the MeNB, a SeNB may create the container that will result in the configuration of additional serving cells for the UE (or decide that it has no resource available to do so).

For UE capability coordination, the MeNB provides (part of) the AS configuration and the UE capabilities to the SeNB.

The MeNB and the SeNB exchange information about UE configuration by means of RRC containers (inter-node messages) carried in X2 messages.

The SeNB may initiate a reconfiguration of its existing serving cells (e.g., PUCCH towards the SeNB).

The SeNB decides which cell is the PSCell within the SCG.

The MeNB does not change the content of the RRC configuration provided by the SeNB.

In the case of the SCG addition and SCG SCell addition, the MeNB may provide the latest measurement results for the SCG cell(s).

Both MeNB and SeNB know the SFN and subframe offset of each other by OAM, e.g., for the purpose of DRX alignment and identification of measurement gap.

When adding a new SCG SCell, dedicated RRC signalling is used for sending all required system information of the cell as for CA described above, except for the SFN acquired from MIB of the PSCell of SCG.

FIGS. 8 and 9 are views illustrating an operating procedure of a terminal (UE) and a base station (eNB) in random access procedure. FIG. 8 is corresponding to non-contention based random access procedure and FIG. 9 is corresponding to contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

The random access procedure is performed for the following events related to the PCell: i) initial access from RRC_IDLE; ii) RRC Connection Re-establishment procedure; iii) Handover; iv) DL data arrival during RRC_CONNECTED requiring random access procedure (e.g. when UL synchronisation status is "non-synchronised".), v) UL data arrival during RRC_CONNECTED requiring random access procedure (e.g. when UL synchronisation status is "non-synchronised" or there are no PUCCH resources for SR available.), and vi) For positioning purpose during RRC_CONNECTED requiring random access procedure; (e.g. when timing advance is needed for UE positioning.)

The random access procedure is also performed on a SCell to establish time alignment for the corresponding sTAG.

In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.

Regarding FIG. 8, FIG. 8 shows the non-contention based random access procedure. As described above, a non-contention based random access procedure may be performed in a handover procedure and when the random access procedure is requested by a command of an eNode B. Even in these cases, a contention based random access procedure may be performed.

First, it is important that a specific random access preamble without the possibility of collision is received from the eNode B, for the non-contention based random access procedure.

The UE receives an assigned random access preamble (S801). Methods of receiving the random access preamble may include a method using HO command generated by target eNB and sent via source eNB for handover, a method using a Physical Downlink Control Channel (PDCCH) in case of DL data arrival or positioning, and PDCCH for initial UL time alignment for a sTAG.

The UE transmits the preamble to the eNode B after receiving the assigned random access preamble from the eNode B as described above (S803).

The UE attempts to receive a random access response within a random access response reception window indicated by the eNode B through a handover command or system information after transmitting the random access preamble in step S703 (S705). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S803.

In the non-contention based random access procedure, it is determined that the random access procedure is normally performed, by receiving the random access response information, and the random access procedure may be finished.

When performing non-contention based random access on the PCell while CA is configured, the Random Access Preamble assignment via PDCCH of steps S801, S803 and S805 of the non-contention based random access procedure occur on the PCell. In order to establish timing advance for a sTAG, the eNB may initiate a non-contention based random access procedure with a PDCCH order (S801) that is sent on a scheduling cell of activated SCell of the sTAG. Preamble transmission (S803) is on the indicated SCell and Random Access Response (S805) takes place on PCell.

When performing non-contention based random access on the PCell or PSCell while DC is configured, the Random Access Preamble assignment via PDCCH of S801, S803 and S805 of the non-contention based random access procedure occur on the corresponding cell. In order to establish timing advance for a sTAG, the eNB may initiate a non-contention based random access procedure with a PDCCH order (S801) that is sent on a scheduling cell of activated SCell of the sTAG not including PSCell. Preamble transmission (S803) is on the indicated SCell and Random Access Response (S805) takes place on PCell in MCG or PSCell in SCG.

FIG. 9 is a view illustrating an operating procedure of a UE and an eNB in a contention based random access procedure.

First, the UE may randomly select a single random access preamble from a set of random access preambles indicated through system information or a handover command, and select and transmit a Physical Random Access Channel (PRACH) capable of transmitting the random access preamble (S901).

There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

A method of receiving random access response information is similar to the above-described non-contention based random access procedure. That is, the UE attempts to receive its own random access response within a random access response reception window indicated by the eNode B through the system information or the handover command, after the random access preamble is transmitted in step S901, and receives a Physical Downlink Shared Channel (PDSCH) using random access identifier information corresponding thereto (S903). Accordingly, the UE may receive a UL Grant, a Temporary C-RNTI, a TAC and the like.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer.

The UE uses the received UL Grant so as to transmit the data (that is, the message 3) to the eNode B (S905). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNode B for contention resolution. That is, the UE attempts to receive the PDCCH so as to receive a specific message (S907). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (S907) can be cross-scheduled by the PCell.

When DC is configured, the first three steps of the contention based random access procedures occur on the PCell in MCG and PSCell in SCG.

FIG. 10 is a view illustrating for interaction model between L1 and L2/3 for Random Access Procedure.

Random access procedure described above is modelled in FIG. 10 below from L1 and L2/3 interaction point of view. L2/L3 receives indication from L1 whether ACK is received or DTX is detected after indication of Random Access Preamble transmission to L1. L2/3 indicates L1 to transmit first scheduled UL transmission (RRC Connection Request in case of initial access) if necessary or Random Access Preamble based on the indication from L1.

FIG. 11 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

The Broadcast Control Channel (BCCH), used for transmission of system information from the network to all terminals in a cell. Prior to accessing the system, a terminal needs to acquire the system information to find out how the system is configured and, in general, how to behave properly within a cell.

The Paging Control Channel (PCCH), used for paging of terminals whose location on a cell level is not known to the network. The paging message therefore needs to be transmitted in multiple cells.

The Common Control Channel (CCCH), used for transmission of control information in conjunction with random access.

The Dedicated Control Channel (DCCH), used for transmission of control information to/from a terminal. This channel is used for individual configuration of terminals such as different handover messages.

The Multicast Control Channel (MCCH), used for transmission of control information required for reception of the MTCH.

The Dedicated Traffic Channel (DTCH), used for transmission of user data to/from a terminal. This is the logical channel type used for transmission of all uplink and non-MBSFN downlink user data.

The Multicast Traffic Channel (MTCH), used for downlink transmission of MBMS services.

From the physical layer, the MAC layer uses services in the form of transport channels. A transport channel is defined by how and with what characteristics the information is transmitted over the radio interface. Data on a transport channel is organized into transport blocks. In each Transmission Time Interval (TTI), at most one transport block of dynamic size is transmitted over the radio interface to/from a terminal in the absence of spatial multiplexing. In the case of spatial multiplexing (MIMO), there can be up to two transport blocks per TTI.

Associated with each transport block is a Transport Format (TF), specifying how the transport block is to be transmitted over the radio interface. The transport format includes information about the transport-block size, the modulation-and-coding scheme, and the antenna mapping. By varying the transport format, the MAC layer can thus realize different data rates. Rate control is therefore also known as transport-format selection.

The following transport-channel types are defined for LTE:

The Broadcast Channel (BCH) has a fixed transport format, provided by the specifications. It is used for transmission of parts of the BCCH system information, more specifically the so-called Master Information Block (MIB).

The Paging Channel (PCH) is used for transmission of paging information from the PCCH logical channel. The PCH supports discontinuous reception (DRX) to allow the terminal to save battery power by waking up to receive the PCH only at predefined time instants. The Downlink Shared Channel (DL-SCH) is the main transport channel used for transmission of downlink data in LTE. It supports key LTE features such as dynamic rate adaptation and channel-dependent scheduling in the time and frequency domains, hybrid ARQ with soft combining, and spatial multiplexing. It also supports DRX to reduce terminal power consumption while still providing an always-on experience. The DL-SCH is also used for transmission of the parts of the BCCH system information not mapped to the BCH. There can be multiple DL-SCHs in a cell, one per terminal scheduled in this TTI, and, in some subframes, one DL-SCH carrying system information.

The Multicast Channel (MCH) is used to support MBMS. It is characterized by a semi-static transport format and semi-static scheduling. In the case of multi-cell transmission using MBSFN, the scheduling and transport format configuration is coordinated among the transmission points involved in the MBSFN transmission.

The Uplink Shared Channel (UL-SCH) is the uplink counterpart to the DL-SCH? that is, the uplink transport channel used for transmission of uplink data.

In addition, the Random-Access Channel (RACH) is also defined as a transport channel, although it does not carry transport blocks.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling? for example, timing-advance commands and random-access response. Control elements are identified with reserved values in the LCID field, where the LCID value indicates the type of control information.

Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

In Dual Connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

The Random Access procedure described in this sub-clause is initiated by a PDCCH order, by the MAC sublayer itself or by the RRC sublayer. Random Access procedure on a SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex; and for Random Access on a SCell, the PDCCH order indicates the ra-PreambleIndex with a value different from 000000 and the ra-PRACH-MaskIndex. For the pTAG preamble transmission on PRACH and reception of a PDCCH order are only supported for SpCell.

FIG. 12 is a diagram for uplink timing advance.

The LTE uplink allows for uplink intra-cell orthogonality, implying that uplink transmissions received from different terminals within a cell do not cause interference to each other. A requirement for this uplink orthogonality to hold is that the signals transmitted from different terminals within the same subframe but within different frequency resources (different resource blocks) arrive approxi-mately time aligned at the base station. More specifically, any timing misalignment between received signals received should fall within the cyclic prefix. To ensure such receiver-side time alignment, LTE includes a mechanism for transmit-timing advance. In essence, timing advance is a negative offset, at the terminal, between the start of a received downlink subframe and a transmitted uplink subframe. By controlling the offset appropriately for each terminal, the network can control the timing of the signals received at the base station from the terminals. Terminals far from the base station encounter a larger propagation delay and therefore need to start their uplink transmissions somewhat in advance, compared to terminals closer to the base station, as illustrated in FIG. 12.

In this specific example, the first terminal is located close to the base station and experiences a small propagation delay, TP,1. Thus, for this terminal, a small value of the timing advance offset TA,1 is sufficient to compensate for the propagation delay and to ensure the correct timing at the base station. However, a larger value of the timing advance is required for the second terminal, which is located at a larger distance from the base station and thus experiences a larger propagation delay.

The timing-advance value for each terminal is determined by the network based on measurements on the respective uplink transmissions. Hence, as long as a terminal carries out uplink data transmission, this can be used by the receiving base station to estimate the uplink receive timing and thus be a source for the timing-advance commands Sounding reference signals can be used as a regular signal to measure upon, but in principle the base station can use any signal transmitted from the terminals.

Based on the uplink measurements, the network determines the required timing correction for each terminal. If the timing of a specific terminal needs correction, the network issues a timing-advance command for this specific terminal, instructing it to retard or advance its timing relative to the current uplink timing. The user-specific timing-advance command is transmitted as a MAC control element on the DL-SCH. The maximum value possible for timing advance is 0.67 ms, corresponding to a terminal-to-base-station distance of slightly more than 100 km. This is also the value assumed when determining the processing time for decoding. Typically, timing-advance commands to a terminal are transmitted relatively infrequently ? for example, one or a few times per second.

If the terminal has not received a timing-advance command during a (configurable) period, the terminal assumes it has lost the uplink synchronization. In this case, the terminal must re-establish uplink timing using the random-access procedure prior to any PUSCH or PUCCH transmission in the uplink.

For carrier aggregation, there may be multiple component carriers transmitted from a single terminal. In principle, different timing advance commands for different component carriers could be envisioned. One motivation for this could be inter-band carrier aggregation, where the different component carriers are received at different geographical locations, for example by using remote radio heads for some of the bands but not others. However, such deployments are not common and in the interest of simplicity LTE is using a single timing-advance command valid for all uplink component carriers.

The MAC entity has a configurable timer timeAlignmentTimer per TAG. The timeAlignmentTimer is used to control how long the MAC entity considers the Serving Cells belonging to the associated TAG to be uplink time aligned.

When a Timing Advance Command MAC control element is received, the MAC entity applies the Timing Advance Command for the indicated TAG, and starts or restarts the timeAlignmentTimer associated with the indicated TAG.

When a Timing Advance Command is received in a Random Access Response message for a serving cell belonging to a TAG, if the Random Access Preamble was not selected by the MAC entity, the MAC entity applies the Timing Advance Command for this TAG, and starts or restarts the timeAlignmentTimer associated with this TAG. Else, if the timeAlignmentTimer associated with this TAG is not running, the MAC entity applies the Timing Advance Command for this TAG, starts the timeAlignmentTimer associated with this TAG. In this case, when the contention resolution is considered not successful, the MAC entity stops timeAlignmentTimer associated with this TAG.

Else, the MAC entity ignores the received Timing Advance Command.

When a timeAlignmentTimer expires, if the timeAlignmentTimer is associated with the pTAG, the MAC entity flushes all HARQ buffers for all serving cells, notifies RRC to release PUCCH/SRS for all serving cells, clears any configured downlink assignments and uplink grants, and considers all running timeAlignmentTimers as expired. Else if the timeAlignmentTimer is associated with an sTAG, then for all Serving Cells belonging to this TAG, the MAC entity flushs all HARQ buffers, and notifies RRC to release SRS.

The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.

FIG. 13 is a diagram for transmitting RRCConnectionReconfiguration message from E-UTRAN and to UE.

The SCG change procedure is used to change configured SCG from one SeNB to another (or the same SeNB) in the UE. Towards target SeNB, the MeNB triggered SCG modification procedure. MeNB indicates in the RRCConnectionReconfiguration message towards the UE that the UE releases the old SCG configuration and adds the new SCG configuration. For the case of SCG change in the same SeNB, the path switch may be suppressed.

The SCG release procedure is used to release the CG in an SeNB. The SCG release procedure is realized by a specific X2 AP procedure not involving the transfer of an inter-eNB RRC message. The MeNB may request the SeNB to release the SCG, and vice versa. The recipient node of this request cannot reject. Consequently, the MeNB indicates in the RRCConnectionReconfiguration message towards the UE that the UE shall release the entire SCG configuration.

If the received scg-Configuration is set to release or includes the mobilityControlInfoSCG (SCG release/change), if mobilityControlInfo is not received (SCG release/change without HO), the UE shall reset SCG MAC, if configured and configure lower layers to consider the SCell(s), except for the PSCell, to be in deactivated state if the received scg-Configuration is set to release. For each drb-Identity value that is part of the current UE configuration, if the DRB indicated by drb-Identity is an SCG DRB, the UE shall re-establish PDCP and the SCG RLC entity. If the DRB indicated by drb-Identity is a split DRB, the UE shall perform PDCP data recovery and re-establish the SCG RLC entity. If the DRB indicated by drb-Identity is an MCG DRB; and drb-ToAddModListSCG is received and includes the drb-Identity value, while for this entry drb-Type is included and set to scg (MCG to SCG), the UE shall re-establish PDCP and the MCG RLC entity.

If the received scg-Configuration is set to release or includes the mobilityControlInfoSCG (SCG release/change), the UE shall release the entire SCG configuration, except for the DRB configuration (as configured by drb-ToAddModListSCG), stop timer T313, if running, and stop timer T307, if running.

If the received scg-Configuration is set to release or includes the mobilityControlInfoSCG (SCG release/change), the UE shall reconfigure the dedicated radio resource configuration for the SCG if the received scg-Configuration includes the radioResourceConfigDedicatedSCG. If the current UE configuration includes one or more split or SCG DRBs and the received RRCConnectionReconfiguration message includes radioResourceConfigDedicated including drb-ToAddModList, the UE shall reconfigure the SCG or split DRB by drb-ToAddModList.

If the received scg-Configuration includes the scg-Counter (SCG establishment/change), the UE shall updates the S-KeNB key based on the KeNB key, using the received scg-Counter value, derive the KUPenc key associated with the cipheringAlgorithmSCG included in the received SCG-ConfigurationSCG, and configure lower layers to apply the ciphering algorithm and the KUPenc key.

If the received scg-Configuration includes the sCellToReleaseListSCG, the UE shall perform SCell release for the SCG. If the received scg-Configuration includes the sCellToAddModListSCG, the UE shall perform SCell addition or modification. If the received scg-Configuration includes the pSCell, the UE shall perform PSCell reconfiguration.

If the received scg-Configuration is set to release or includes the mobilityControlInfoSCG (SCG release/change), the UE shall configure lower layers in accordance with mobilityControlInfoSCG, if received.

In this case if the received scg-Configuration includes the mobilityControlInfoSCG (SCG change), the UE shall resume all SCG DRBs and resume SCG transmission for split DRBs, if suspended, stop timer T313, if running, start timer T307 with the timer value set to t307, as included in the mobilityControlInfoSCG, start synchronising to the DL of the target PSCell, and initiate the random access procedure on the PSCell.

In the prior art, the UE triggers random access when the network orders to initiate the random access procedure by PDCCH, or when UE MAC or RRC layer initiates the random access procedure by itself. The goal of RA is to acquire uplink timing synchronization for data transfer or uplink resource to transmit data.

In Rel-13, cells other than the special cell (i.e., PCell or PSCell) could be configured with PUCCH resource in order to offload the PUCCH traffic from the special cell to other cells. As the UE transmits e.g., HARQ feedbacks, on PUCCH, the cell with PUCCH resource should be prepared for data transmission on PUCCH by acquiring uplink timing synchronization. According to the prior art, the uplink timing synchronization is acquired by reception of TAC MAC CE or TAC in RAR from the network. For this, random access procedure may be required; however, the random access procedure on SCell is only performed by the PDCCH order. This would bring delay and additional signaling overhead to acquire uplink timing synchronization.

FIG. 14 is a conceptual diagram for initiating a random access procedure in a carrier aggregation system according to embodiments of the present invention.

In this invention, when a SCell configured with PUCCH resource (PUCCH SCell) is newly configured for a UE, the UE triggers a random access procedure if the PUCCH SCell belongs to a TAG for which the associated timeAlignmentTimer (TAT) is not running.

The UE receives, from a eNB, an RRC signal which configures a new SCell with PUCCH resource (S1401).

The eNB transmits the RRC signal to the UE in order to add the SCell with PUCCH resource to the UE, including: an identifier of the PUCCH SCell, or an identifier of the TAG to which the PUCCH SCell belongs.

When the UE receives an RRC signal from the network which configures the PUCCH SCell, the UE checks whether the TAT associated with the TAG to which the new SCell with the PUCCH resource belong is running or not (S1403).

In detail, when the UE receives the RRC signal which configures the new SCell with PUCCH resource to the TAG from the network, a RRC entity of the UE transmits an indication indicating a MAC entity of the UE to add the new SCell with the PUCCH resource to the TAG. When the MAC entity of the UE receives the indication indicating the new SCell with the PUCCH resource is added to the TAG, the MAC entity of the UE checks whether the TAT associated with the TAG is running or not.

The UE initiates a random access procedure on the New SCell in the TAG if the associated TAT is not running (S1405), and if the associated TAT is running, the UE does not initiate the random access procedure (SD1407).

In detail, if the TAT associated with the TAG is not running, the MAC entity of the UE initiates the random access procedure, and if the TAT associated with the TAG is running, the MAC entity of the UE does not initiate the random access procedure.

The UE MAC may initiate the random access procedure on the cell other than the added new SCell, e.g., special cell, one of PUCCH SCell already belongs to the TAG.

In conclusion, the Random Access procedure described in this subclause is initiated by a PDCCH order, by the MAC sublayer itself or by the RRC sublayer. Random Access procedure on a SCell not configured with PUCCH resource shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell.

Random Access procedure on a SCell configured with PUCCH resource can be initiated by a PDCCH order or by the MAC sublayer itself. If a SCell configured with PUCCH resource is added to a TAG for which timeAlignmentTimer is not running, the MAC entity shall initiate a Random Access procedure on this SCell. For Random Access on the SpCell a PDCCH order or RRC optionally indicate the ra-PreambleIndex and the ra-PRACH-MaskIndex; and for Random Access on a SCell, the PDCCH order indicates the ra-PreambleIndex with a value different from 000000 and the ra-PRACH-MaskIndex. For the pTAG preamble transmission on PRACH and reception of a PDCCH order are only supported for SpCell.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
receiving, by the UE from a network, a Radio Resource Control (RRC) signal which configures a new Secondary Cell (SCell), wherein the new SCell belongs to a Timing Advance Group (TAG) containing only SCells and no PCell;
checking, by the UE, whether a Time Alignment Timer (TAT) associated with the TAG is running or not; and
initiating a random access procedure on the new SCell in the TAG, when the associated TAT is not running,
wherein when the new SCell is configured with a Physical Uplink Control Channel (PUCCH) resource, the UE initiates the random access procedure on the new SCell by transmitting a random access preamble on the new SCell to the network, and
wherein when the new SCell is not configured with a PUCCH resource, the random access procedure on the new SCell is initiated by a PDCCH order received on the new SCell from the network.

2. The method according to claim 1, wherein when the new SCell is configured with a PUCCH resource, the random access procedure is initiated by a Medium Access Control (MAC) entity of the UE by transmitting the random access preamble on the new SCell to the network.

3. The method according to claim 1, wherein the RRC signal includes at least one of: an identifier of the new SCell with the PUCCH resource to be configured, or an identifier of the TAG to which the new SCell with the PUCCH resource belong.

4. The method according to claim 1, wherein when the UE receives the RRC signal which configures the new SCell with a PUCCH resource to the TAG from the network, a RRC entity of the UE transmits an indication informing a MAC entity of the UE to add the new SCell with the PUCCH resource to the TAG.

5. The method according to claim 4,
wherein when the MAC entity of the UE receives the indication to add the new SCell with the PUCCH resource to the TAG, the MAC entity of the UE checks whether the TAT associated with the TAG is running or not, and
wherein when the TAT associated with the TAG is running, the MAC entity of the UE does not initiate the random access procedure.

6. A User Equipment (UE) operating in a wireless communication system, the UE comprising:
a transmitter;
a receiver, and
a processor, operably coupled with the transmitter and the receiver, that:
controls the receiver to receive, from a network, a Radio Resource Control (RRC) signal which configures a new Secondary Cell (SCell), wherein the new SCell belongs to a Timing Advance Group (TAG) containing only SCells and no PCell,
checks whether a Time Alignment Timer (TAT) associated with the TAG is running or not, and
initiates a random access procedure on the new SCell in the TAG when the associated TAT is not running,
wherein when the new SCell is configured with a Physical Uplink Control Channel (PUCCH) resource, the UE initiates the random access procedure on the new SCell by transmitting a random access preamble on the new SCell to the network, and wherein when the new SCell is not configured with a PUCCH resource, the random access procedure on the new SCell is initiated by a PDCCH order received on the new SCell from the network.

7. The UE according to claim 6, wherein when the new SCell is configured with PUCCH resource, the random access procedure is initiated by a Medium Access Control (MAC) entity of the UE by transmitting random access preamble on the new SCell to the network.

8. The UE according to claim 6, wherein the RRC signal includes at least one of:
an identifier of the new SCell with the PUCCH resource to be configured, or an identifier of the TAG to which the new SCell with the PUCCH resource belong.

9. The UE according to claim 6, wherein when the processor receives the RRC signal which configures a new SCell with a PUCCH resource to the TAG from the network, a RRC entity of the UE transmits an indication informing a MAC entity of the UE to add the new SCell with the PUCCH resource to the TAG.

10. The UE according to claim 9,
wherein when the MAC entity of the UE receives the indication to add the new SCell with the PUCCH resource to the TAG, the MAC entity of the UE checks whether the TAT associated with the TAG is running or not, and
wherein when the TAT associated with the TAG is running, the MAC entity of the UE does not initiate the random access procedure.

* * * * *